(12) United States Patent
Zhu

(10) Patent No.: US 10,828,853 B2
(45) Date of Patent: Nov. 10, 2020

(54) THERMAL MANAGEMENT DEVICE AND METHOD USING PHASE CHANGE MATERIAL

(71) Applicant: The Boeing Company, Chicago, IL (US)

(72) Inventor: Alex X. Zhu, Charleston, SC (US)

(73) Assignee: The Boeing Company, Chicago, IL (US)

( * ) Notice: Subject to any disclaimer, the term of this patent is extended or adjusted under 35 U.S.C. 154(b) by 441 days.

(21) Appl. No.: 15/365,425

(22) Filed: Nov. 30, 2016

(65) Prior Publication Data

US 2018/0149437 A1    May 31, 2018

(51) Int. Cl.
| | | |
|---|---|---|
| *B29C 73/10* | (2006.01) |
| *B29C 73/34* | (2006.01) |
| *F28D 20/00* | (2006.01) |
| *F28D 20/02* | (2006.01) |
| *B64F 5/40* | (2017.01) |
| B64C 1/12 | (2006.01) |
| B64C 3/26 | (2006.01) |
| B64C 1/00 | (2006.01) |

(52) U.S. Cl.
CPC ............. *B29C 73/10* (2013.01); *B29C 73/34* (2013.01); *B64F 5/40* (2017.01); *B64C 1/12* (2013.01); *B64C 3/26* (2013.01); *B64C 2001/0072* (2013.01); *F28D 20/021* (2013.01); *F28D 2020/0008* (2013.01)

(58) Field of Classification Search
CPC ...... F28D 20/02; F28D 20/021; F28D 20/023; F28D 2020/0047; F28D 1/0391; F28D 2020/0008; F28D 2020/0021; F28D 2020/0013; F28D 20/00; B29C 73/10; B29C 73/34; B29C 73/32

See application file for complete search history.

(56) References Cited

U.S. PATENT DOCUMENTS

| | | | | |
|---|---|---|---|---|
| 3,587,578 A | * | 6/1971 | Walker | A61F 7/02 604/304 |
| 4,408,659 A | * | 10/1983 | Hermanns | F28D 13/00 165/10 |
| 4,446,916 A | * | 5/1984 | Hayes | C22C 47/00 165/10 |
| 4,807,696 A | * | 2/1989 | Colvin | F28D 20/023 126/400 |
| 5,366,801 A | * | 11/1994 | Bryant | D06N 3/0059 428/305.5 |
| 5,442,156 A | | 8/1995 | Westerman et al. | |

(Continued)

OTHER PUBLICATIONS

Sharma et al., "Review on thermal energy storage with phase change materials and applications," ScienceDirect, Renewable and Sustainable Energy Reviews 13, 2009, pp. 318-345.

(Continued)

*Primary Examiner* — Joel M Attey
*Assistant Examiner* — For K Ling
(74) *Attorney, Agent, or Firm* — Yee & Associates, P.C.

(57) ABSTRACT

A device manages thermal energy applied to a composite patch on a structure having a heat sink. The device includes an enclosure configured to be placed on the structure overlying the composite patch, and a phase change material within the enclosure for absorbing the thermal energy.

20 Claims, 19 Drawing Sheets

(56) References Cited

U.S. PATENT DOCUMENTS

| | | | |
|---|---|---|---|
| 5,532,039 A * | 7/1996 | Payne | B32B 3/12 428/116 |
| 5,753,271 A | 5/1998 | Heimerdinger | |
| 6,004,662 A | 12/1999 | Buckley | |
| 6,031,212 A | 2/2000 | Westerman et al. | |
| 6,270,603 B1 * | 8/2001 | Westerman | B29C 35/02 156/94 |
| 6,766,797 B1 * | 7/2004 | Lavigne | F24V 30/00 126/263.05 |
| 2003/0167719 A1 * | 9/2003 | Alderman | B32B 1/02 52/407.3 |
| 2007/0281122 A1 | 12/2007 | Blanchard et al. | |
| 2008/0138131 A1 * | 6/2008 | Jung | G03G 15/2039 399/329 |
| 2008/0264620 A1 * | 10/2008 | Numasawa | B21C 37/151 165/177 |
| 2009/0211726 A1 * | 8/2009 | Bank | C09K 5/063 165/10 |
| 2010/0140842 A1 | 6/2010 | Nelson et al. | |
| 2011/0271638 A1 * | 11/2011 | Tierney | B32B 27/12 52/745.05 |
| 2012/0145703 A1 * | 6/2012 | Matsen | B29C 73/10 219/618 |
| 2012/0227247 A1 | 9/2012 | Nelson et al. | |
| 2014/0144572 A1 * | 5/2014 | Zowalla | B29C 70/542 156/94 |
| 2015/0266144 A1 * | 9/2015 | Bengaouer | F28D 20/021 165/10 |

OTHER PUBLICATIONS

Humfeld, "System and Method for Forming a Composite Part," U.S. Appl. No. 14/794,238, filed Jul. 8, 2015, 28 pages.

* cited by examiner

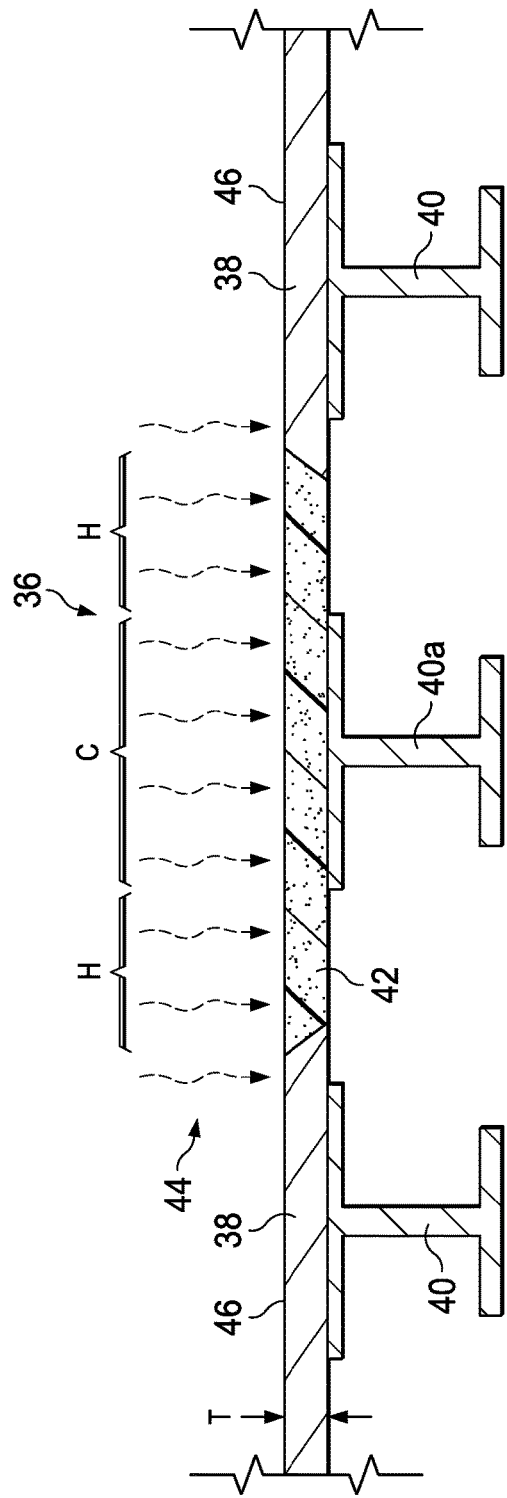
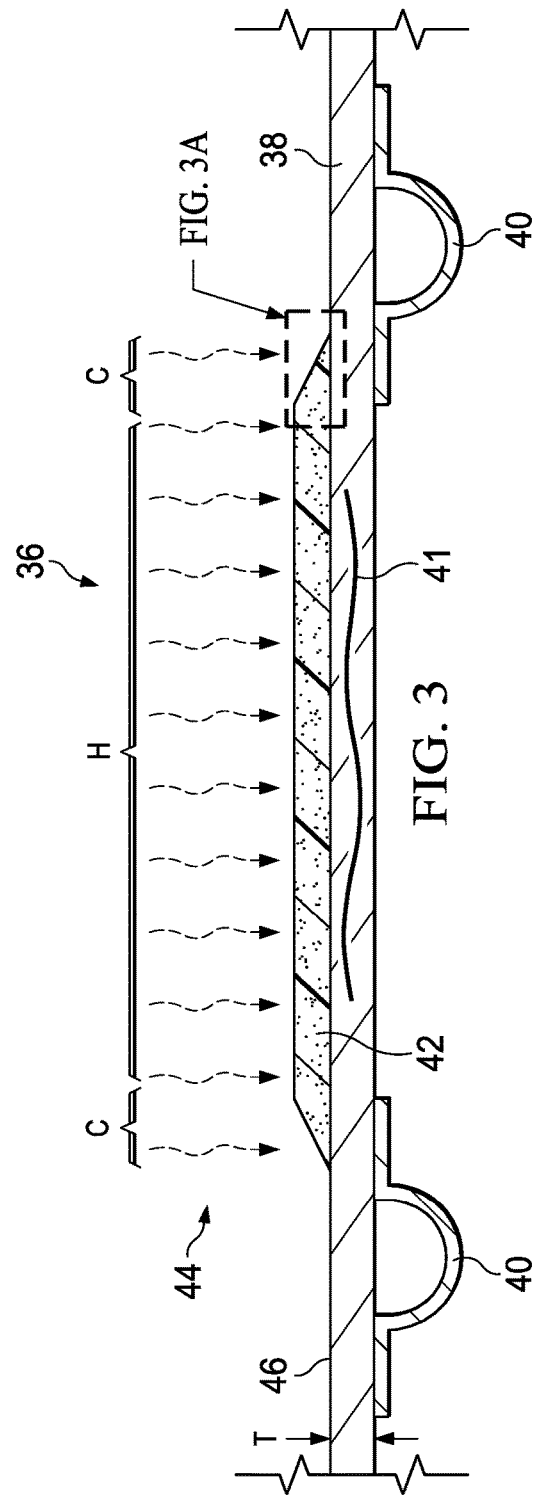

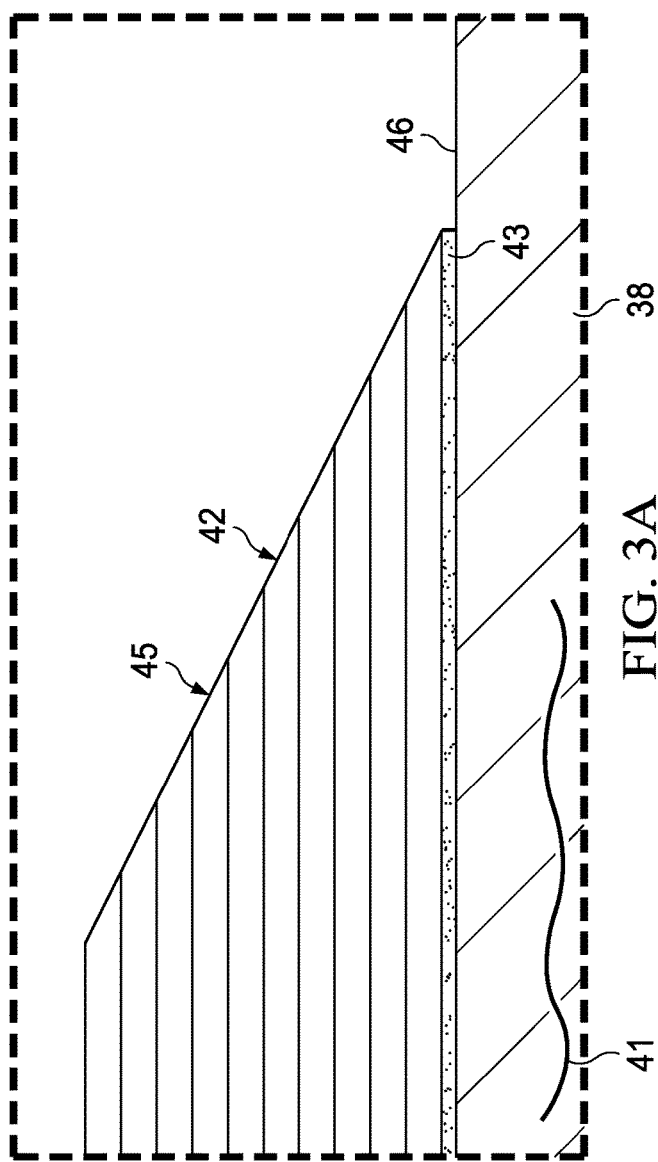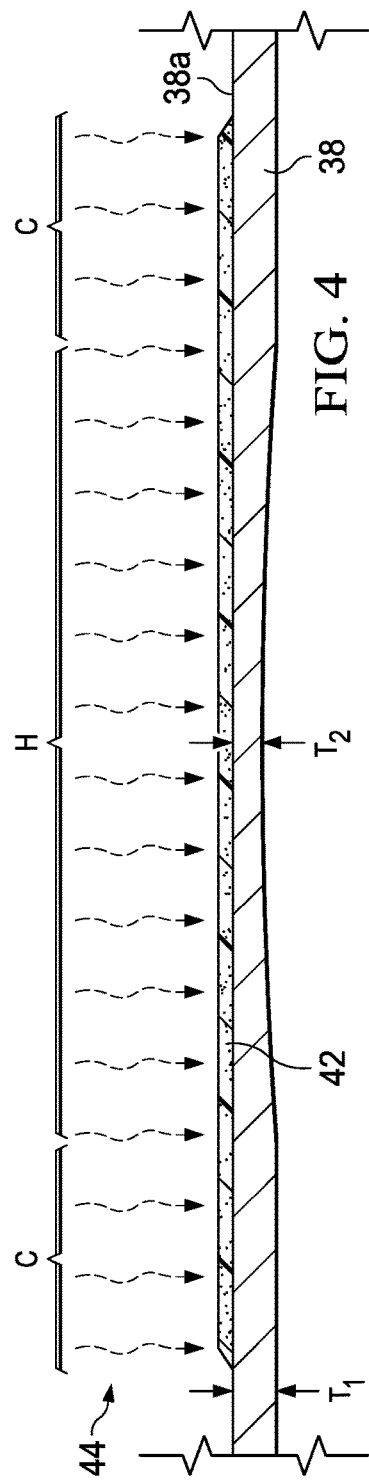

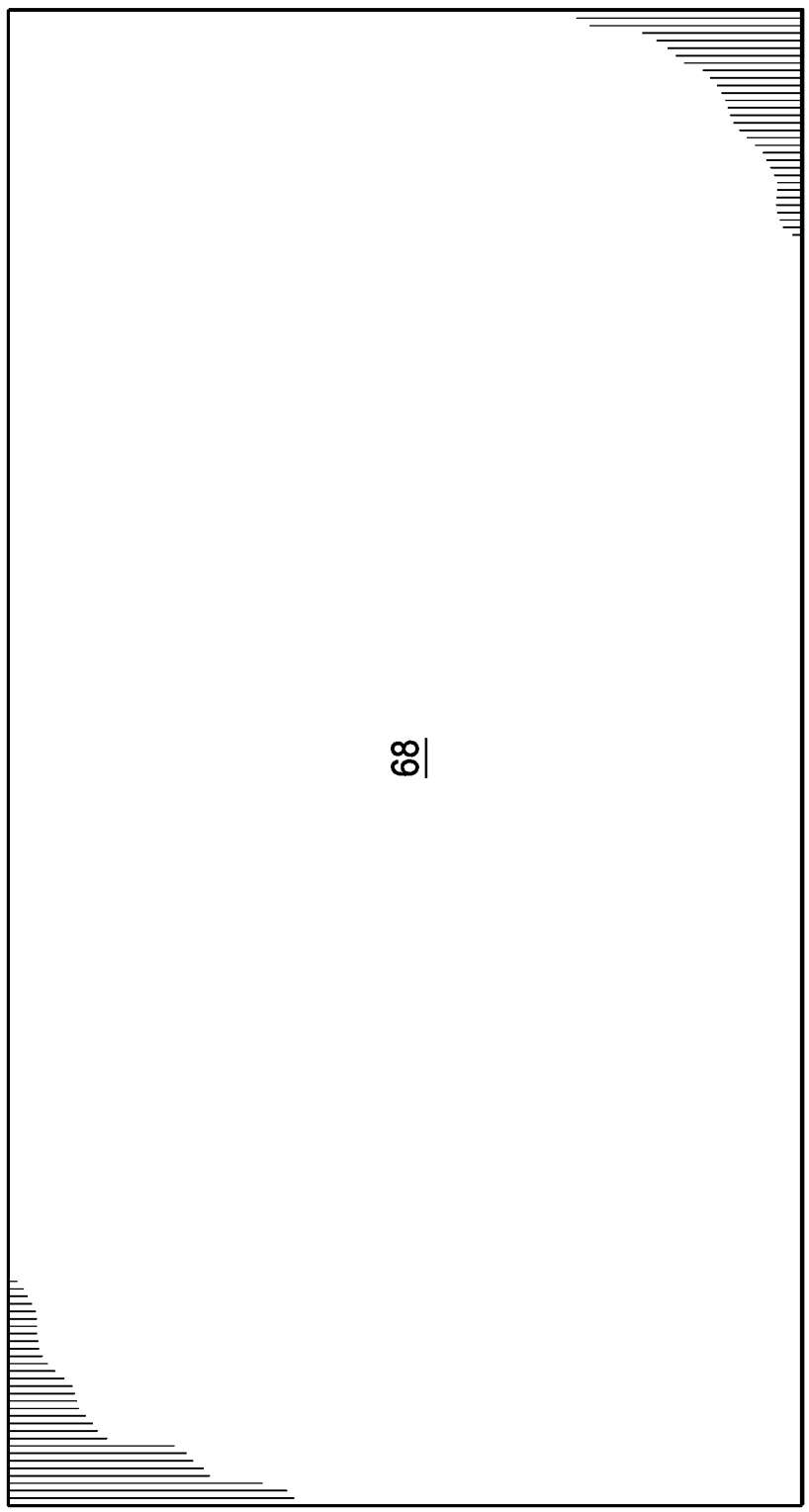

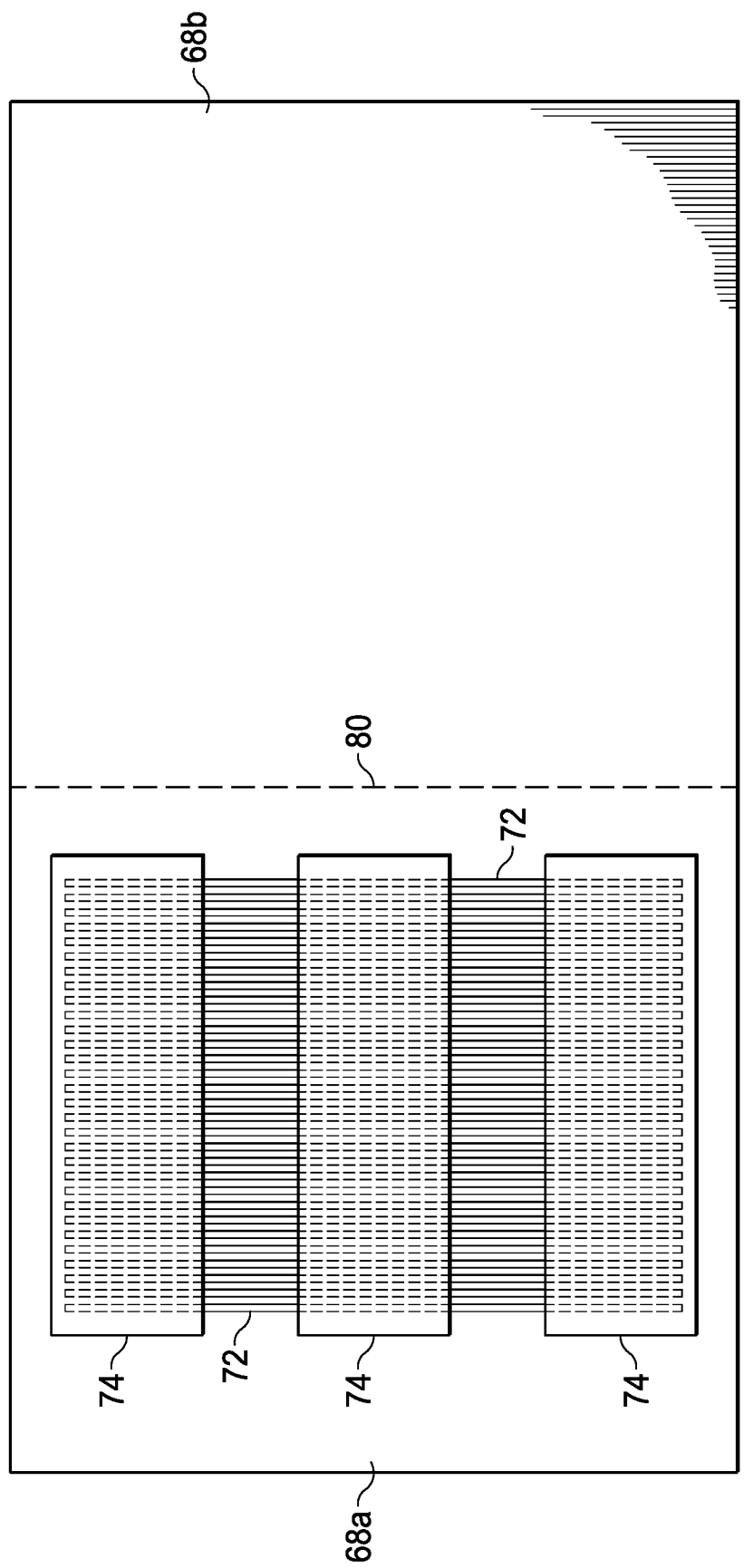

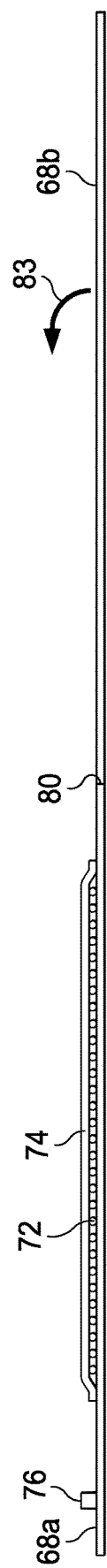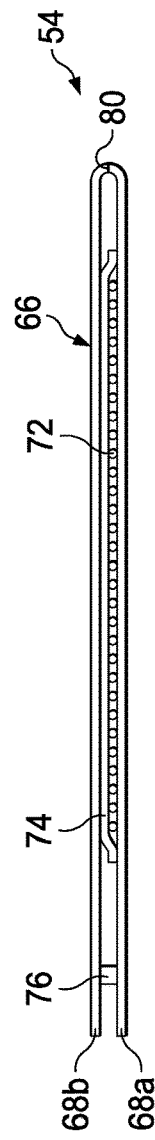
FIG. 9E
FIG. 9F

THERMAL MANAGEMENT DEVICE AND METHOD USING PHASE CHANGE MATERIAL

BACKGROUND INFORMATION

1. Field

The present disclosure generally relates to thermal management in structures, and deals more particularly with a device and method for preventing localized excess heating of a composite repair patch during curing.

2. Background

Repair and/or rework of certain structures such as the skin of an aircraft is often performed by installing a composite repair patch on an area of the skin requiring repair/rework. The repair patch typically comprises a fiber reinforced composite laminate that is bonded to the skin using film or paste adhesives. Using vacuum bag compaction and heat applied by a heating blanket, the repair patch is cured and bonded to the skin in-situ.

Even though the heating blanket provides even heat over its area, uniform heating of the repair patch is sometimes difficult to achieve where structures such as stringers and spars are present beneath the skin. These structures can act as heat sinks which absorb the applied thermal energy, causing uneven heating of the patch. Methods to minimize such issues, for example selectively installing insulation or conducting thermal surveys, can be time-consuming and labor-intensive.

SUMMARY

The disclosure relates in general to repair of a structure, and more specifically to thermal management of composite repairs, and specifically to a repair patch on a skin of an aircraft. During thermal curing of the repair, localized overheating of the repair patch is reduced or eliminated using a thermal management device that employs a phase change material. The phase change material absorbs excess thermal energy without increasing in temperature.

According to one aspect, a device for managing thermal energy applied to a composite patch on a structure having a heat sink. The device comprises an enclosure configured to be placed on the structure overlying the composite patch, and a phase change material within the enclosure for absorbing the thermal energy.

According to another aspect, a device is provided for reducing hot spots in a composite patch placed on a structure and thermally cured in-situ. The device comprises a sheet of film folded over into itself to form first and second overlapping layers of material, and a plurality of phase change material elements located between the first and second layers of material, each of the phase change material elements being formed of a phase change material capable of absorbing thermal energy at the hot spots while maintaining a substantially constant temperature. The device also includes a seal between the first and second overlapping layers of material forming an enclosure around the phase change material elements.

According to still another aspect, a method is provided of repairing a structure. The method comprises placing a composite patch on an area of the structure requiring repair, providing a thermal management device containing a phase change material, and placing a thermal management device over the composite patch. The method also includes placing a vacuum bag over the composite patch and the thermal management device, applying compaction pressure to the composite patch by evacuating the vacuum bag, thermally curing the composite patch, including applying heat to the composite patch, and using the thermal management device to manage distribution of heat applied to the composite patch.

One of the advantages of the disclosed embodiments is that hot spots in a thermally cured repair patch may be reduced or eliminated, using a simple device that can be quickly and easily assembled at low cost. The size and shape of the device is easily configurable to suit the application. Owing to its low-cost, the device is disposable, although in some applications it may be reused if desired. Another advantage is that the disclosed thermal management device and method may reduce or eliminate the need to install thermal insulation materials required to insulate thermal sinks from the repair patch. Still another advantage is that thermal surveys of the repair area may be reduced or eliminated. Additionally, use of the device during a composite repair results in a buffer period during which a technician may carry out adjustments needed to achieve uniform heating.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 2 is an illustration of a sectional view taken along the line 2-2 in FIG. 1;

FIG. 3 is an illustration of a sectional view taken along the line 3-3 in FIG. 1;

FIG. 3A is an illustration of the area designated as "FIG. 3A" in FIG. 3;

FIG. 4 is an illustration of a cross-sectional view of a skin having a varying thickness and a repair patch installed on the surface thereof;

FIGS. 9A-9F are illustrations of plan views showing successive stages of fabrication of the thermal management device shown in FIGS. 5 and 8;

DETAILED DESCRIPTION

Figure 1:
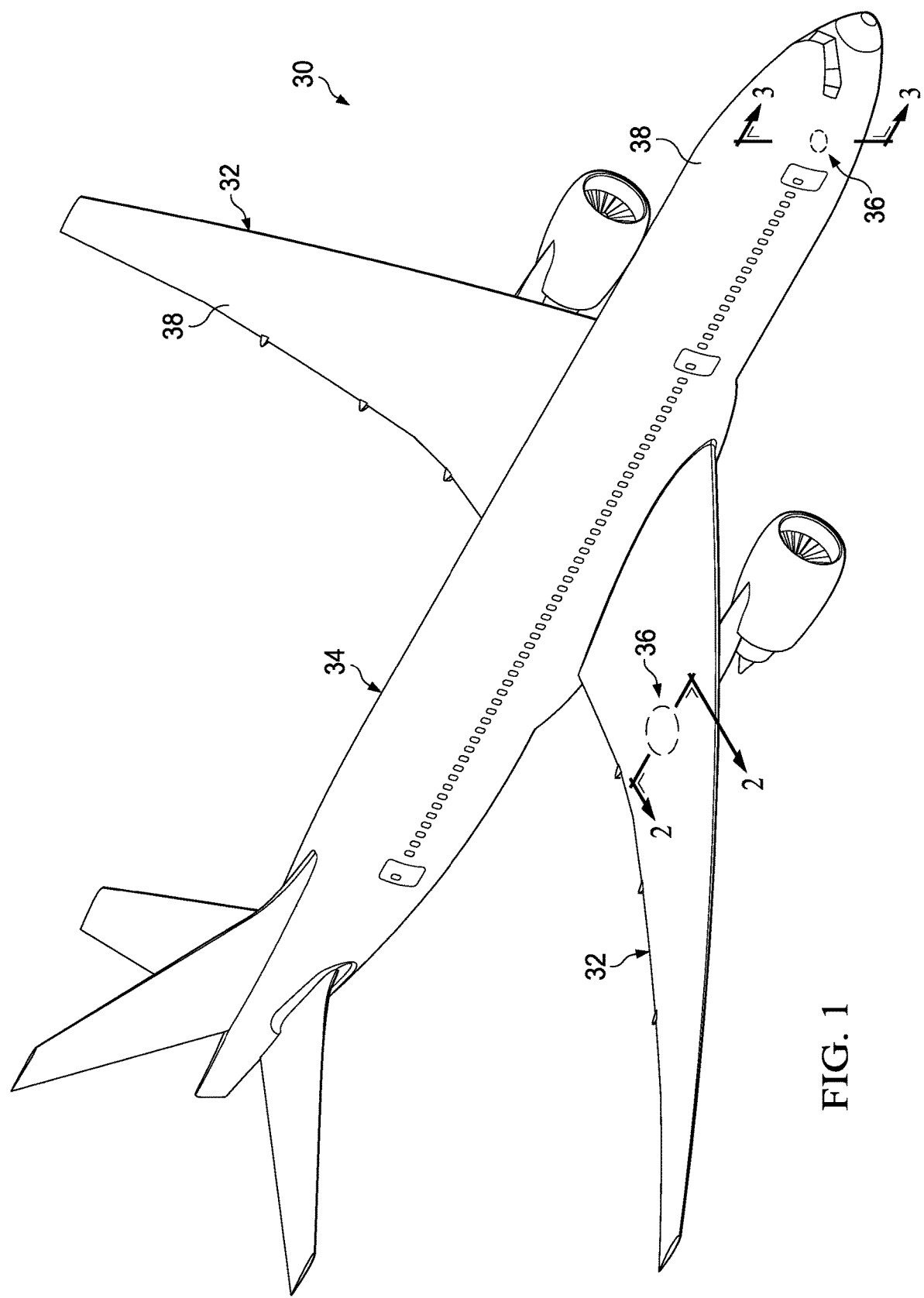
FIG. 1 is an illustration of a perspective view of an airplane showing repair areas on the outer skin.

The disclosed embodiments relate to devices and methods for repairing or reworking structures using a repair patch. One example of such a structure is an outer skin 38 of the airplane 30 shown in FIG. 1. In this example, local areas 36 (sometimes referred to herein as a repair area 36) on a wing 32 and the fuselage 34 of the airplane 30 require repair or rework (collectively "repair"). The repairs may be necessary because of damage to or inconsistencies in the skin 38. The skin 38 may comprise a metal such as titanium or aluminum, or a composite. As will be discussed below in more detail, the skin repairs are carried out using a composite repair patch, typically a fiber reinforced, thermoset or a thermoplastic laminate which is bonded to the skin 38 over the repair area 36.

FIG. 2 illustrates the repair area 36 on the wing 32 of the airplane 30 shown in FIG. 1. The skin 38 has a thickness "T" and is attached to underlying, laterally spaced stringers 40 each having an I-shaped cross-section. In one example of a repair, a section of the skin 38 in the repair area 36 is removed (scarfed) and a correspondingly shaped, composite repair patch 42 with tapered edges is installed in the scarfed area using a suitable bonding adhesive (not shown). The composite repair patch 42 may be pre-cured or uncured. Following placement of the repair patch 42 in the repair area 36, the repair patch 42 is vacuum bagged and heat 44 is applied to repair patch 42 using a heating blanket (not shown) or other devices for applying the heat 44. The applied heat 44 results in thermal curing of the repair patch 42 (in the case of the uncured composite patch) and the bonding adhesive, thereby bonding the repair patch 42 to the skin 38. For purposes of this description "thermal curing" and "cure temperature" refer to the cure temperature of a composite laminate repair patch formed of a thermosetting polymer resin, a thermoplastic polymer resin, hybrid material systems containing both thermosets and thermoplastics, and bonding adhesives used to bond such patches to an underlying structure. Thermal sinks beneath the skin 38 may result in uneven heating of the repair patch 42 during the curing process. In the example shown in FIG. 2, one of the stringer 40a, located directly beneath the repair patch 42, acts as a potential heat sink which may allow heat to collect under the repair patch 42 in the area of the stringer 40a during the thermal curing process. As a result of this heat sink, uneven heating of the repair patch 42 may occur wherein areas of the repair patch 42 are relatively hot "H" and another area of repair patch 42 that overlies stringer 40a is relatively cold "C".

FIG. 3 illustrates the repair area 36 on the fuselage 34 of the airplane 30 shown in FIG. 1. A local area 36 of the skin 38 containing an inconsistency 41 is repaired by applying a multi-ply 45 composite repair patch 42 on the surface 46 of the skin 38 overlying the inconsistency 41. The repair patch 42 is bonded to the skin surface 46 using a layer 43 of bonding adhesive which may comprise a paste adhesive or a film adhesive. In this example, a pair of spaced apart hat stringers 40 are located on the underside of the skin 38, near the outer edges of the repair patch 42. The stringers 40 are potential heat sinks which may result in cold spots "C" and hot spots "H" in the repair patch 42 during thermal curing.

FIG. 4 illustrates repair of still another structure where cold spots "C" and hot spots "H" in a repair patch 42 may occur during thermal curing of the repair patch 42. In this example, the structure comprises a skin 38 having varying thicknesses $T_1$, $T_2$, and the repair patch 42 is bonded to the outer surface of the skin 38. The variation in skin thickness results in cold spots "C" in thicker areas ($T_1$) of the skin 38 where applied heat 44 is absorbed more slowly during thermal curing, compared to thinner areas ($T_2$) where heat 44 is absorbed by the skin 38 more quickly, resulting in hot spots "H" in the thinner ($T_2$) areas of the skin 38. Thus, "hot spots" as used herein includes changes in skin thickness and similar variances.

Figure 5:
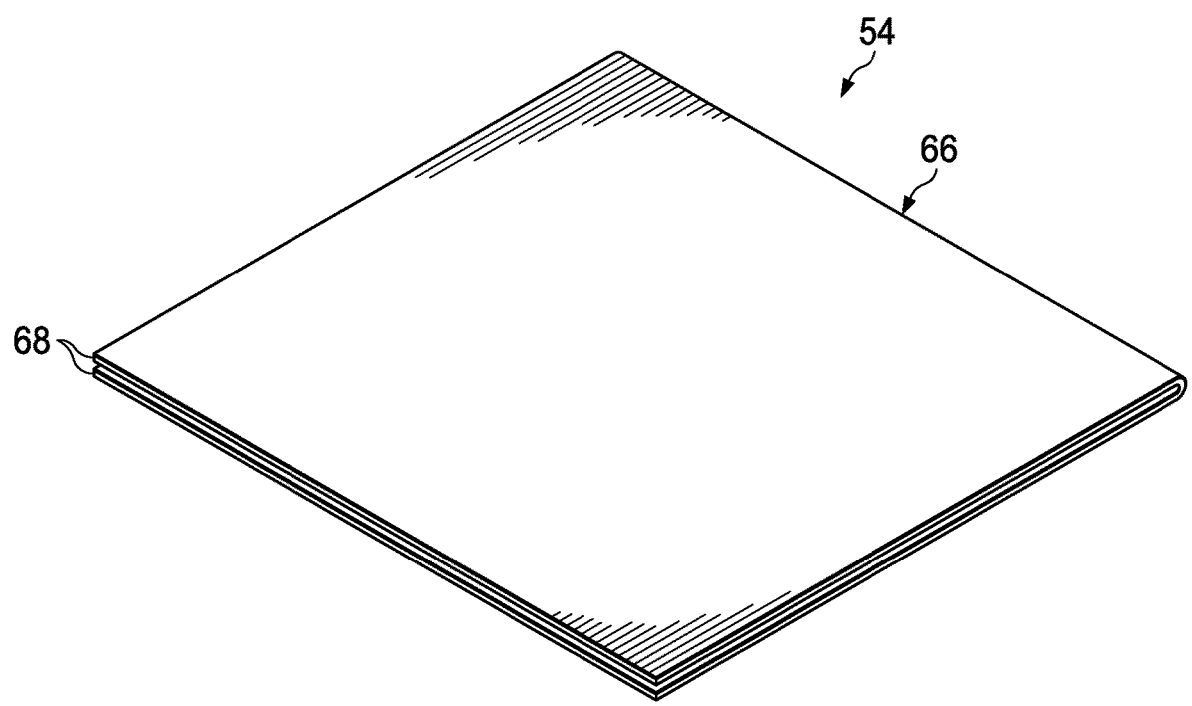
FIG. 5 is an illustration of a perspective view of a thermal management device.
Figure 6:
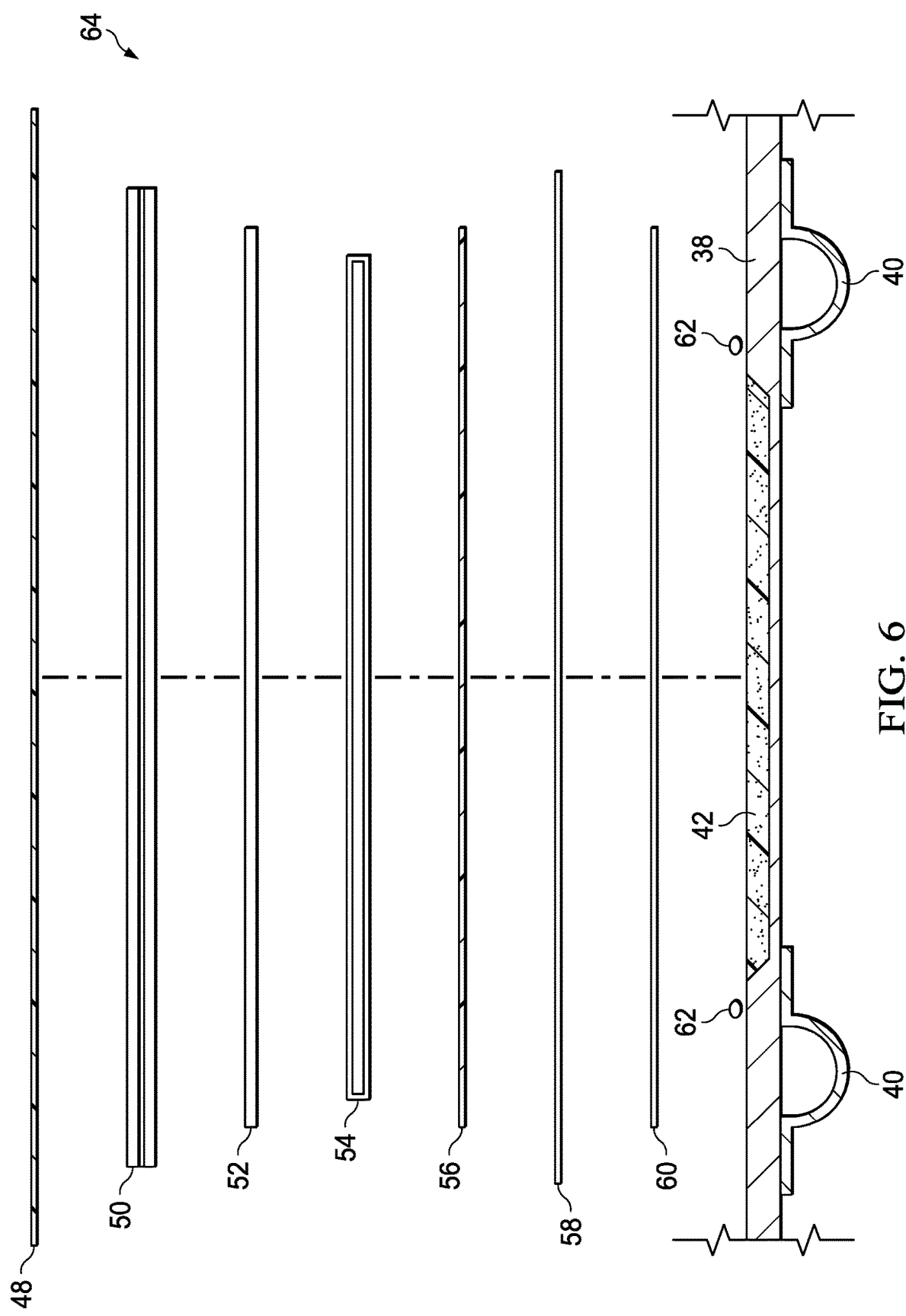
FIG. 6 is an illustration of an exploded, cross-sectional view of an assembly for curing a repair patch on the skin using the thermal management device of FIG. 5.
Figure 8:
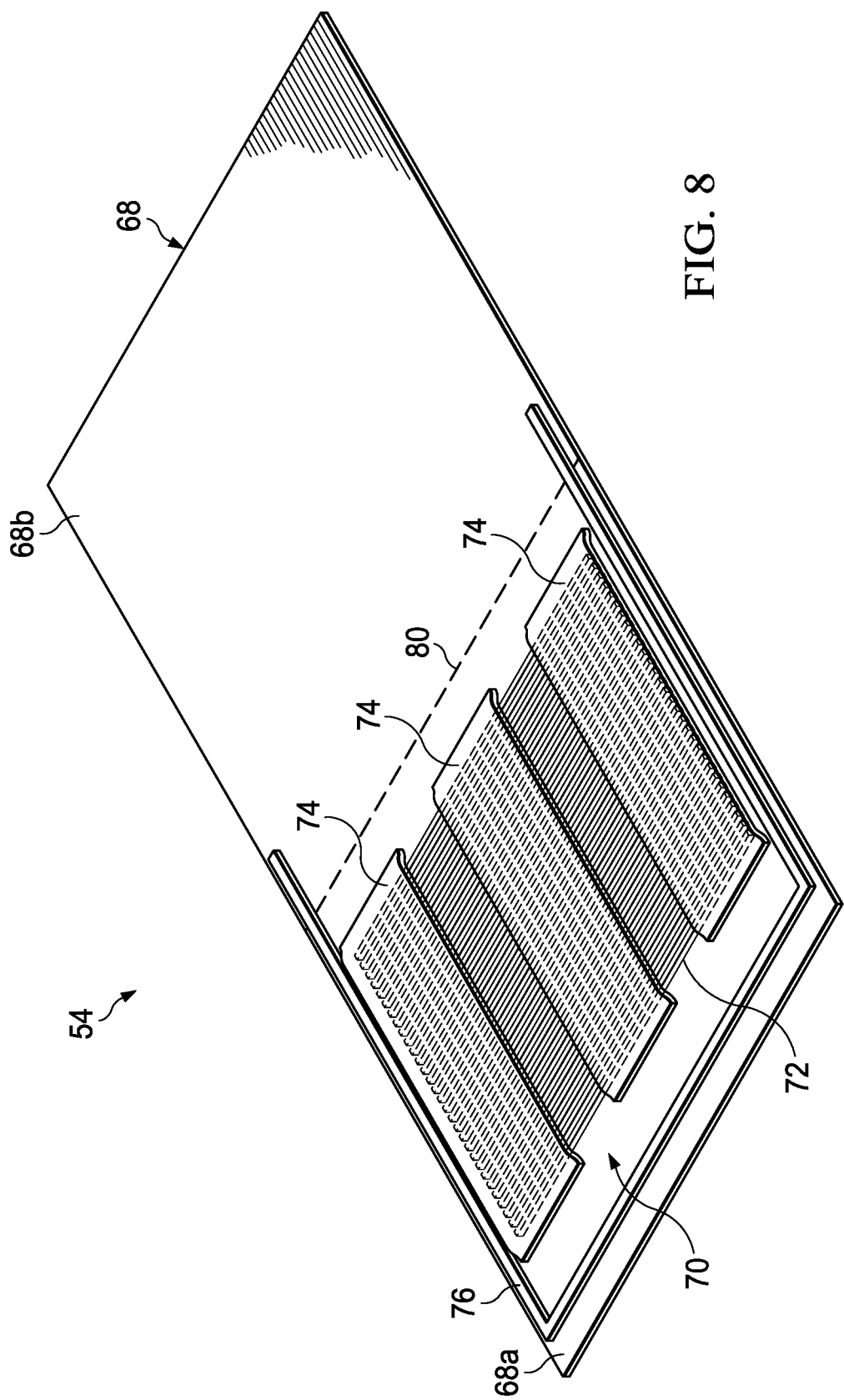
FIG. 8 is an illustration of a perspective view of the thermal management device, prior to being folded and sealed.

Attention is now directed to FIGS. 5 and 6 which illustrate a device 54 for managing thermal energy applied to a composite repair patch 42 on a structure such as the previously described skin 38. The device 54 comprises a sealed bag-like enclosure 66 containing a quantity of a phase change material 70 (FIG. 8). As will be discussed below in more detail, the device 54 manages thermal energy used to cure the repair patch 42, in a manner that reduces or eliminates hotspots and results in substantially uniform heating of the repair patch 42 over its entire area. Although the device 54 is represented as being substantially flat in FIGS. 5 and 6, it is formed of flexible material, such as a flexible film, that allows it to flex and conform to underlying curved or contoured surfaces of a structure, including contoured aircraft skins 38.

FIG. 6 illustrates a typical curing assembly 64 used to cure a repair patch 42 applied to a skin 38. A bonding adhesive (not shown) is applied to the repair patch 42 and/or the skin 38, following which the repair patch 42 is placed in a scarfed area of the skin 38. Next, a perforated bleeder film 60, a layer of fiberglass 58 or similar bleeder material and a release film 56 are placed over the repair patch 42. One or more thermocouples 62 may be placed between the bleeder film 60 and the repair patch 42 in order to allow monitoring of the temperature of the repair patch 42 during the curing process. Next, the thermal management device 54 is placed over the release film 56, and an electrical heating blanket 52 is placed on top of the thermal management device 54. The breather 50 is placed over the heating blanket 52, following which a vacuum bag 48 is placed over the entire assembly 64 described above, and sealed to the surface of the skin 38.

With the curing assembly 64 installed over the repair patch 42 as previously described, the vacuum bag 48 is evacuated, causing compaction pressure to be applied to the repair patch 42, and the heating blanket 52 is activated to supply heat to the repair patch 42 at temperatures sufficient to effect thermal curing according to a predetermined cure schedule. In examples where the repair patch 42 includes a thermosetting resin matrix, the repair patch 42 is heated to cure temperatures typically between 150° C. and 200° C. However, where the repair patch 42 includes a thermoplastic resin matrix, the repair patch 42 is heated to temperatures typically ranging from 345° C. to 400° C. in order to effect consolidation of the laminate repair patch 42.

Figure 7:
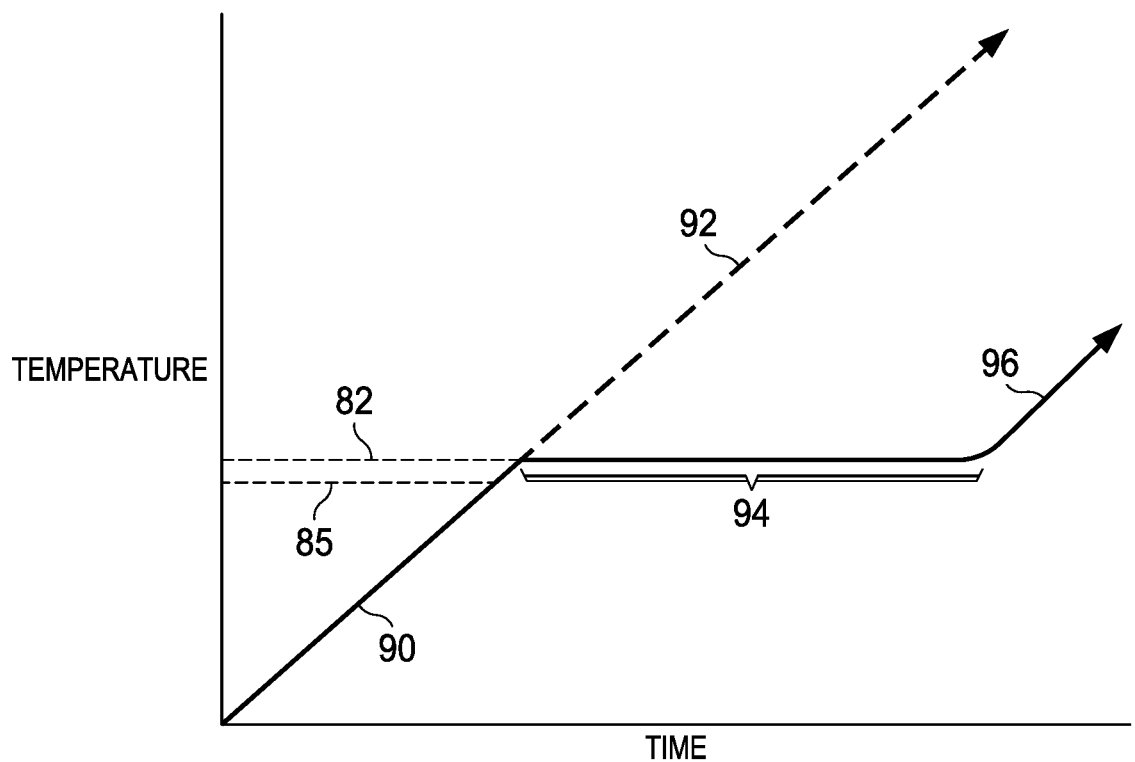
FIG. 7 is an illustration of a chart showing the temperature of the thermal management device during thermal curing of the repair patch.

Referring to FIG. 7, the device 54 contains a later discussed phase change material 70 (FIG. 8) having a melting point 82 slightly above the cure temperature 85 (in the case of a thermosetting resin) or the consolidation temperature 85 (in the case of a thermoplastic resin). As used herein, "phase change material" refers to any material with a high heat of fusion which, melting at certain temperatures, is capable of absorbing and storing substantial energy. In the present application, as thermal energy is transferred from the heating blanket 52 to the repair patch 42, the device 54 absorbs the thermal energy and remains at a constant temperature as the phase change material 70 melts. In effect, the device 54 manages the thermal energy transferred to the repair patch 42 in a manner that reduces or eliminates hotspots in the repair patch 42 during the curing process. The type and amount of phase change material 70 used in the device 54 will vary with the application. In choosing a particular phase change material 70 for a given application, primary performance characteristics of the phase change material 70 to be considered will be its melting temperature, and its latent heat of fusion, i.e. the amount of energy the material can consume during its phase change. Secondary considerations in choosing the material may involve other factors such as toxicity, flammability, etc.

As the repair patch 42 is being heated, the phase change material 70 absorbs thermal energy when it reaches the melting temperature 82. When the melting temperature 82 is reached, the absorbed thermal energy is used to melt the phase change material 70. It should be noted here that the device 54 does not necessarily heat uniformly over its area, but rather absorbs more thermal energy in those areas of the skin that are prone to overheating. As shown at 94 in FIG. 7, the temperature of the phase change material 70 remains substantially constant for a period of time while it absorbs thermal energy, rather than continuing to increase 92. During the period 94 that the temperature of the phase change material 70 remains constant, a technician may make any adjustments in the curing assembly 64 that may be necessary and/or install insulative materials in order to achieve uniform heating of the repair patch 42.

As a result of the thermal energy absorption by the phase change material 70, the underlying repair patch 42 is prevented from increasing in temperature substantially beyond the cure temperature 85, and overheating. When the phase change material 70 has melted, the device 54, and thus the underlying area of the repair patch 42, continues 96 increasing in temperature. It should be noted here that the phase change material 70 may not melt in order for the device 54 to successively manage the thermal energy distribution over the repair patch 42. For example, a predetermined amount of phase change material 70 suitable for a particular application will absorb the desired degree of thermal energy in potential hotspots over the area of the patch without actually melting.

FIG. 8 illustrates additional details of one example of the device 54. A sheet of flexible film 68 (sometimes also referred to herein as a "film sheet") comprising first and second layers 68a, 68b respectively, is folded along a line 80 to form the bag-like enclosure 66 (FIG. 5). The film sheet 68 may comprise, without limitation, typical vacuum bag materials, such as, without limitation, nylon, polyethylene, and polyurethane that are suitable for the application, and particularly the processing temperatures being encountered. Phase change material 70 is positioned on one layer 68a of the sheet of film 68. In this example, the phase change material 70 comprises a plurality of phase change solder rods 72 arranged side-by-side. Solder rods 72 may comprise, for example and without limitation, a blend of 60% Sn (Tin) and 40% Pb (Lead), or a blend of 63% Sn and 37% Pb, or a blend of 58% Bi (Bismuth) and 42% Sn, depending on the cure temperatures involved. Other blends are possible, depending on the application and cure temperature.

The solder rods 72 are held in place by strips of suitable adhesive tape 74. A strip of adhesive sealant 76 surrounds the outer perimeter of one layer 68a of the film sheet and extends slightly onto the second layer 68b. As will be discussed below, during fabrication of the device 54, the second layer 68b of the film sheet 68 is folded over onto the first layer 68a, and the sealant 76 seals the two layers 68a, 68b together to form the enclosure 66. The sealant 76 prevents the escape of melted phase change material 70 from the enclosure 66.

Figure 9B:
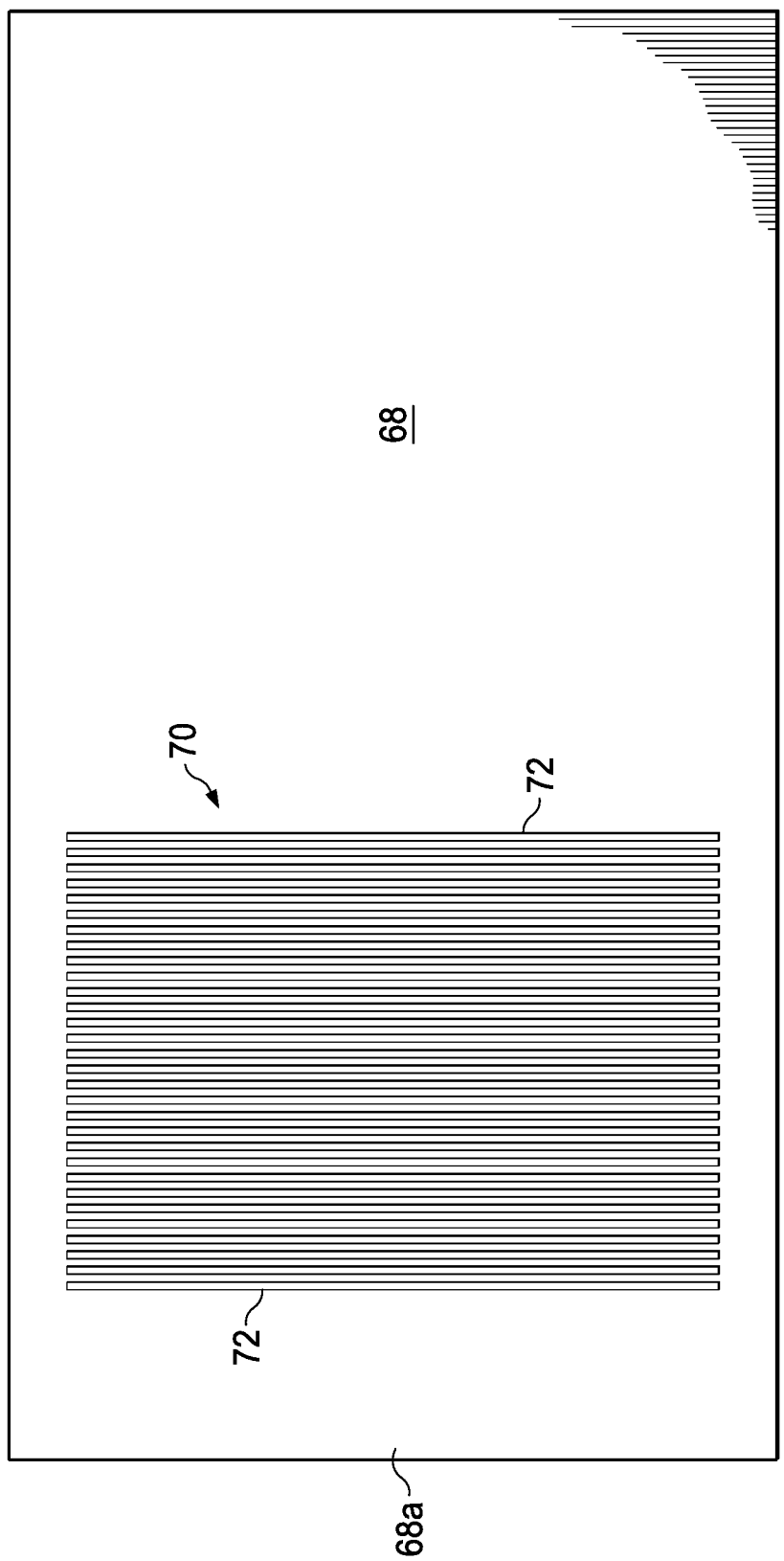
Figure 9D:
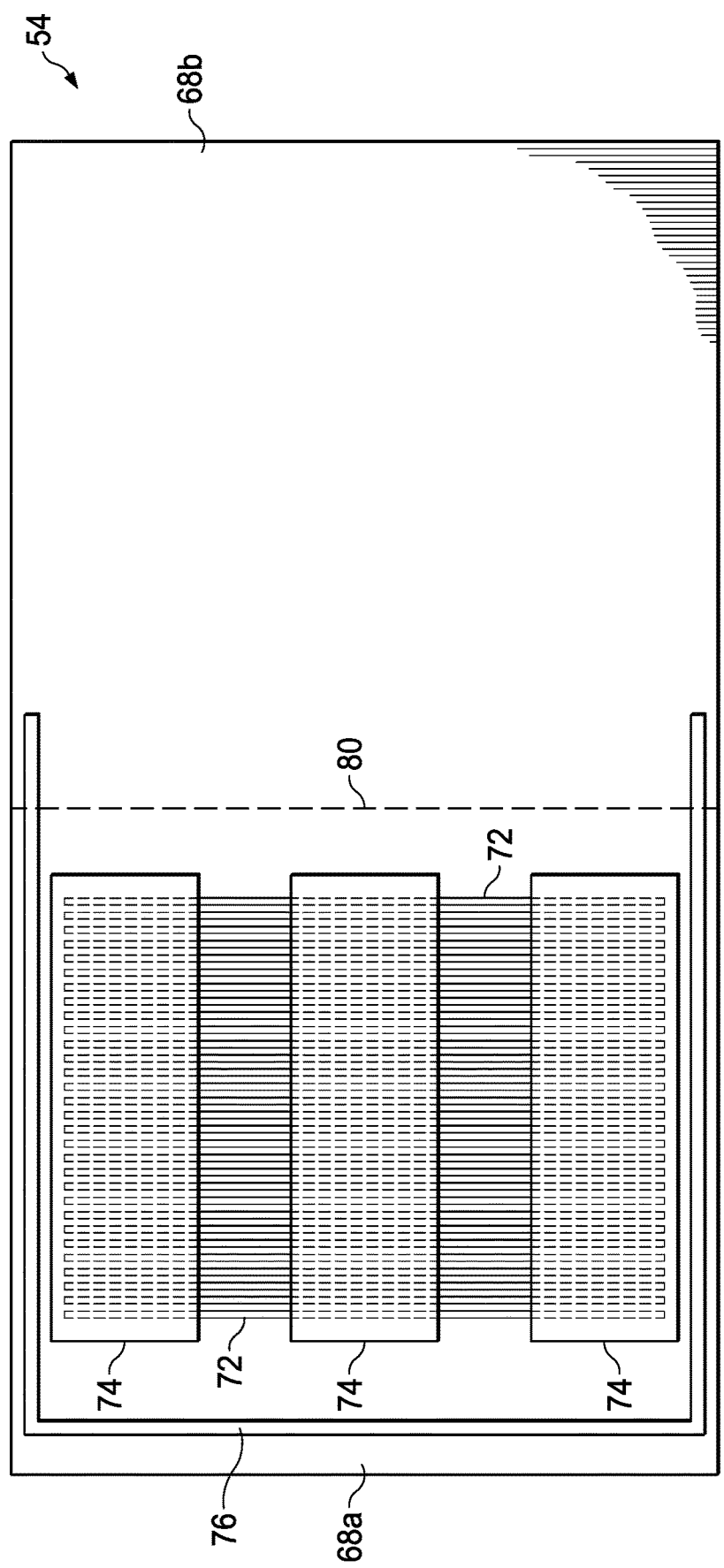

Attention is now directed to FIGS. 9A-9F which illustrate sequential steps for fabricating the device shown in FIG. 8. As shown in FIG. 9A, a sheet of film 68 is cut to the desired width and length dimensions. Referring to FIG. 9B, a plurality of the solder rods 72 are placed, and generally centered on one layer 68a of the film sheet 68. In FIG. 9C, strips of tape 74 are used to adhere the solder rods 72 to the film sheet 68 after the film sheet is folded over in a subsequent step, thereby fixing the solder rods 72 in place. Next as shown in FIG. 9D, a suitable adhesive sealant, which may be in strip tape form, is placed and adhered around a portion of the periphery of the film sheet 68, surrounding the solder rods 72 around three sides thereof and extending partially onto the second layer 68b. Next, as shown in FIG. 9E, the film sheet 68 is folded onto itself, as by folding 83 the second layer 68b along the fold line 80 onto the first layer 68a, thereby bringing the interior face of the second layer 68b into sealing contact with the sealant 76 (see FIG. 9F).

Figure 10:
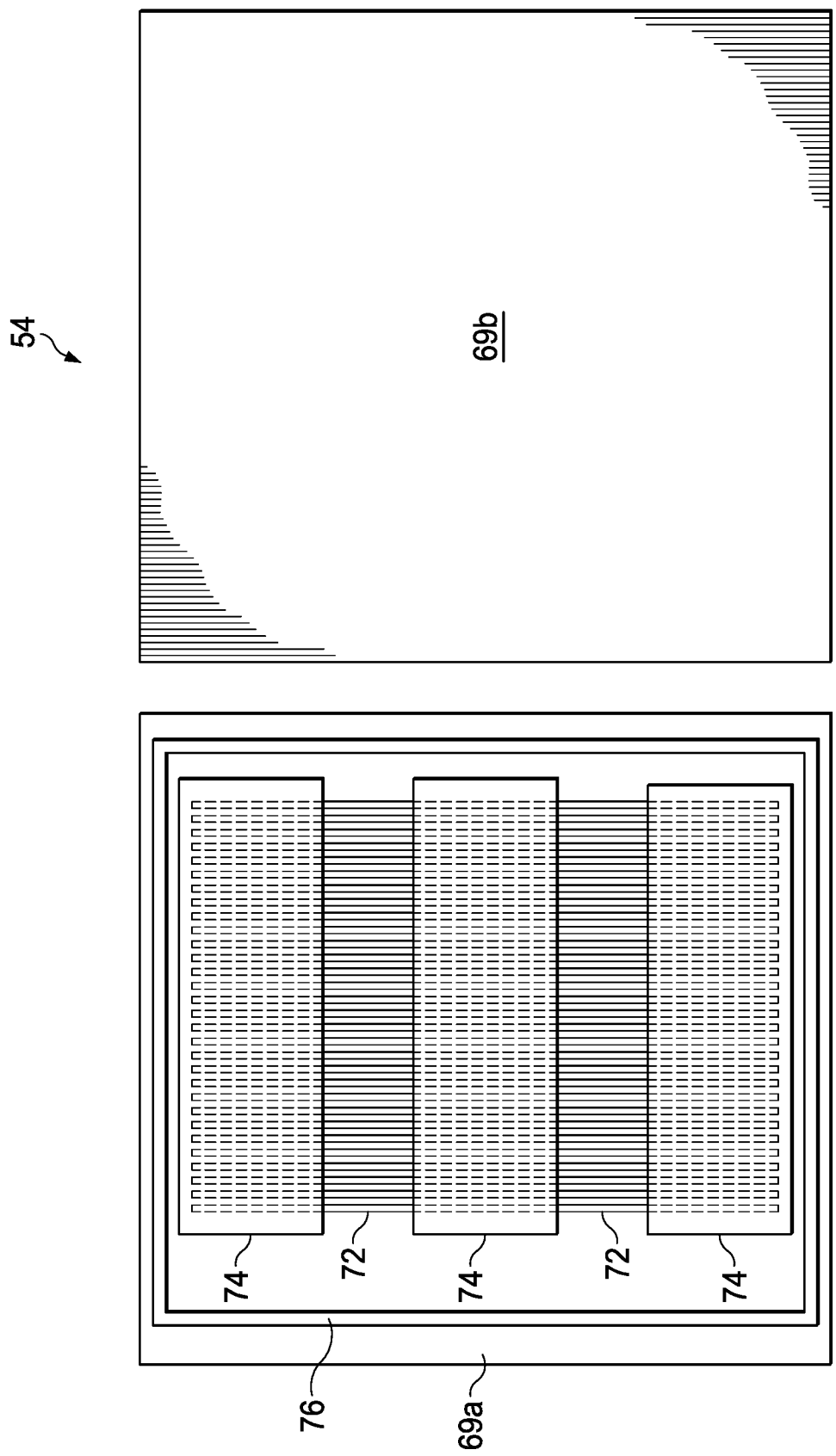
FIG. 10 is an illustration of a plan view of an alternate embodiment of the thermal management device.

Folding a single film sheet 68 onto itself to form the bag-like enclosure 66 as described above is convenient and simple. However, as shown in FIG. 10, the desired enclosure 66 for the phase change material 70 may be formed using two separate film sheets 69a, 69b, which are superimposed and adhered together around their entire peripheries by a sealant 76 that completely surrounds the phase change material 70.

Figure 11:
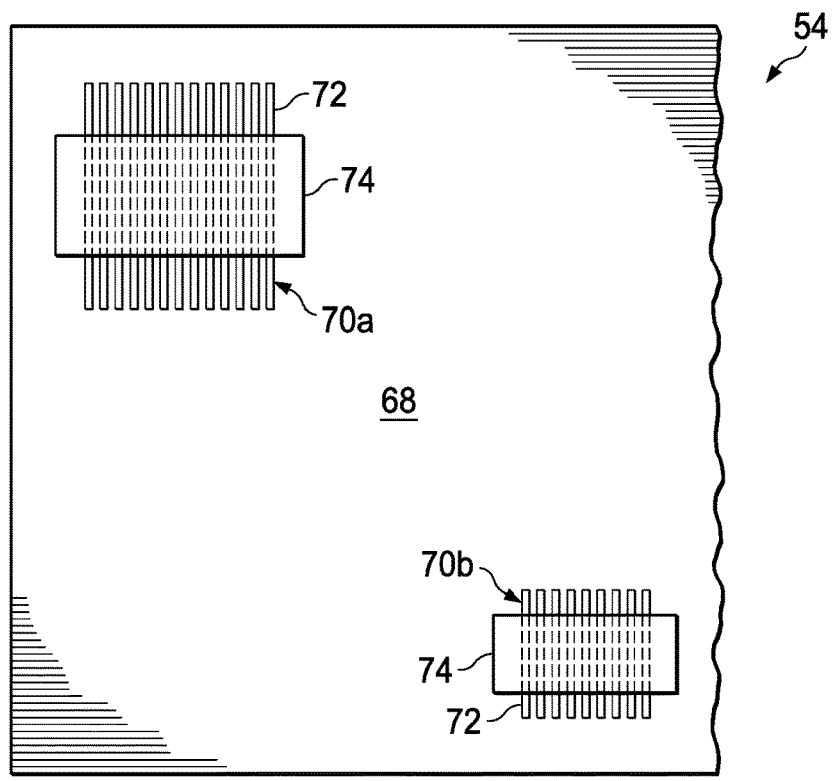
FIG. 11 is an illustration of a fragmentary plan view of another embodiment of the thermal management device.

In some applications, the phase change material 70 may be located only in certain areas of the device 54. For example, as shown in FIG. 11, two separate sections 70a, 70b of phase change material comprising solder rods 72 may be located in differing areas of the device 54. The locations of the sections of 70a, 70b containing the phase change material 70 overlie heat sinks (not shown in FIG. 11) beneath the skin 38 (FIG. 2). Moreover, depending on the application, differing amounts of the phase change material 70 may be located in different areas of the device 54, for example, sections 70a, 70b, in order to absorb different amounts of heat in these areas.

Figure 12:
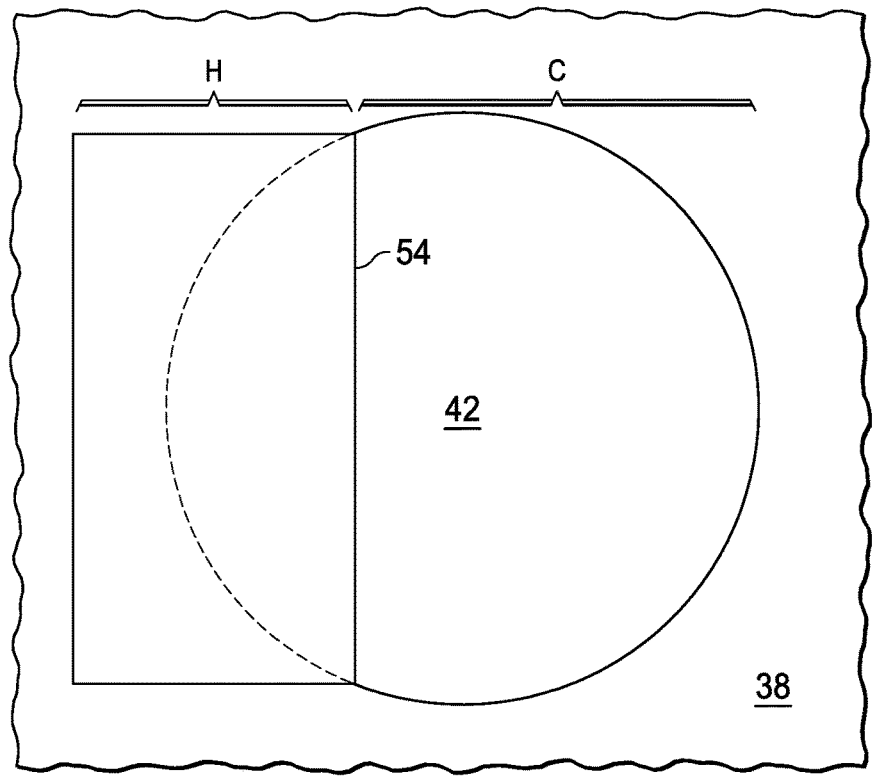
FIG. 12 is an illustration of a fragmentary plan view showing a thermal management device covering over only a portion of a repair patch.

The device 54 may not cover the entire area of the repair patch 42. For example, referring to FIG. 12, the repair patch 42 installed on a skin 38 may have underlying heat sinks that may result in a potential hotspot "H" on the left side of the repair patch 42, as viewed in the Figure. Under these circumstances, the device 54 is configured only to cover the left side of the repair patch 42.

Figure 13:
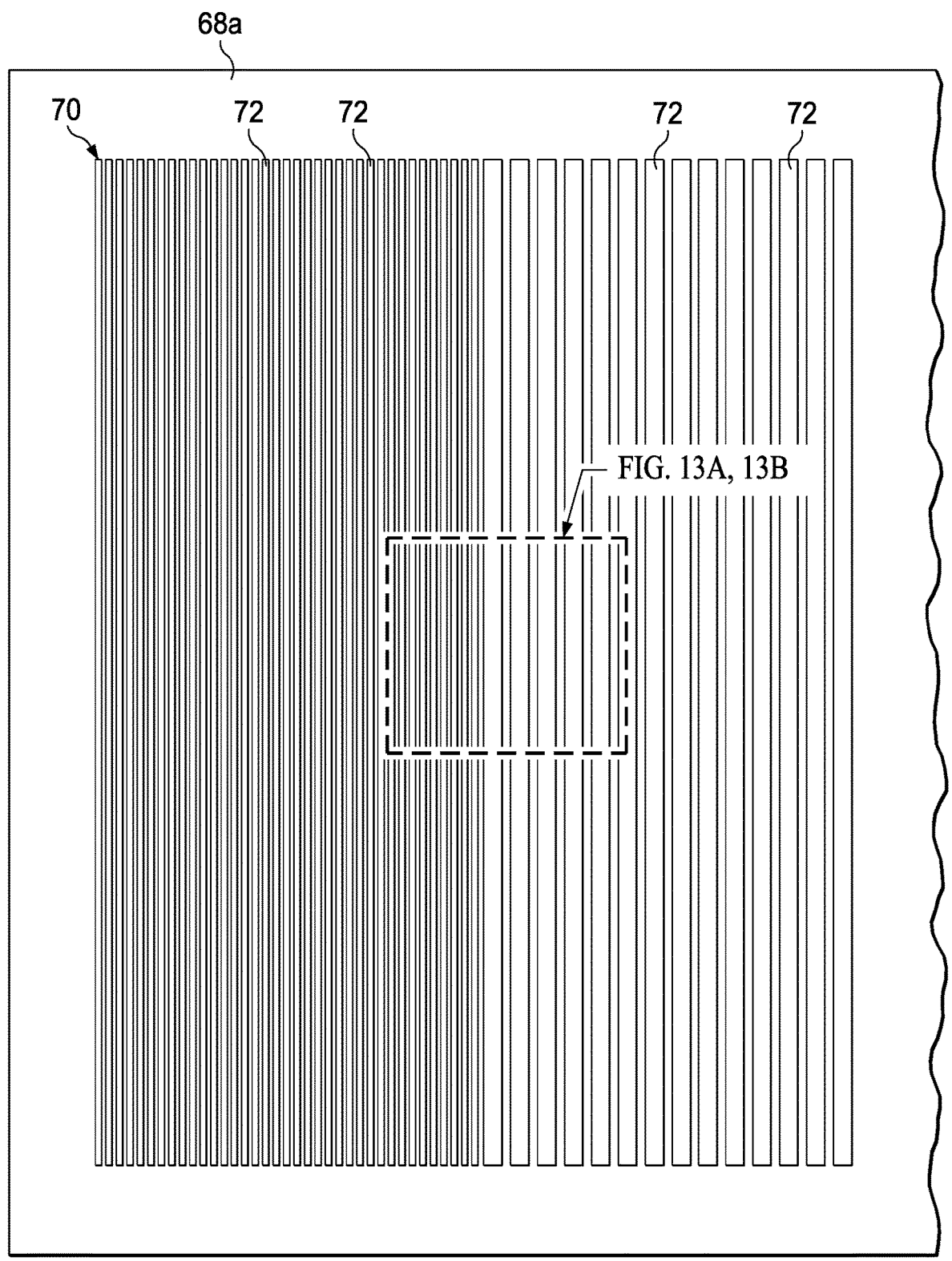
FIG. 13 is an illustration of a fragmentary, plan view of a further embodiment of the thermal management device.
Figure 13A:
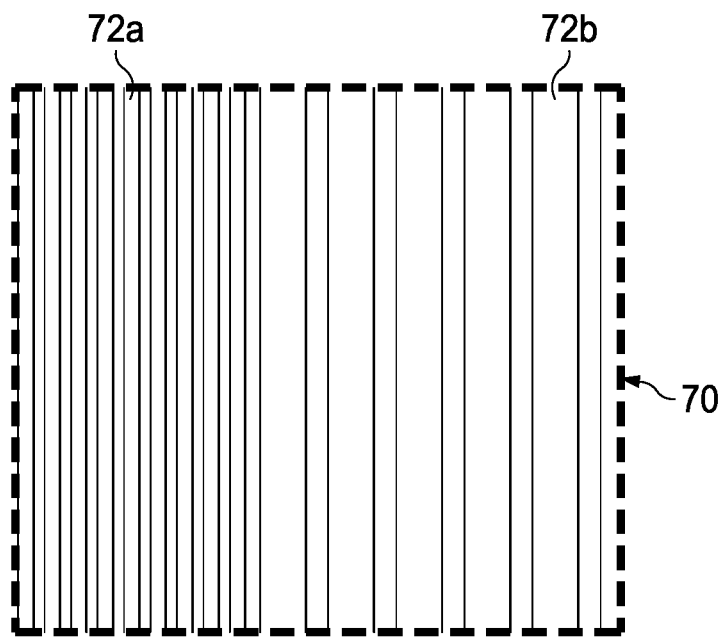
FIGS. 13A and 13B are illustrations showing alternate arrangements of the solder rods shown in FIG. 13.
Figure 13B:
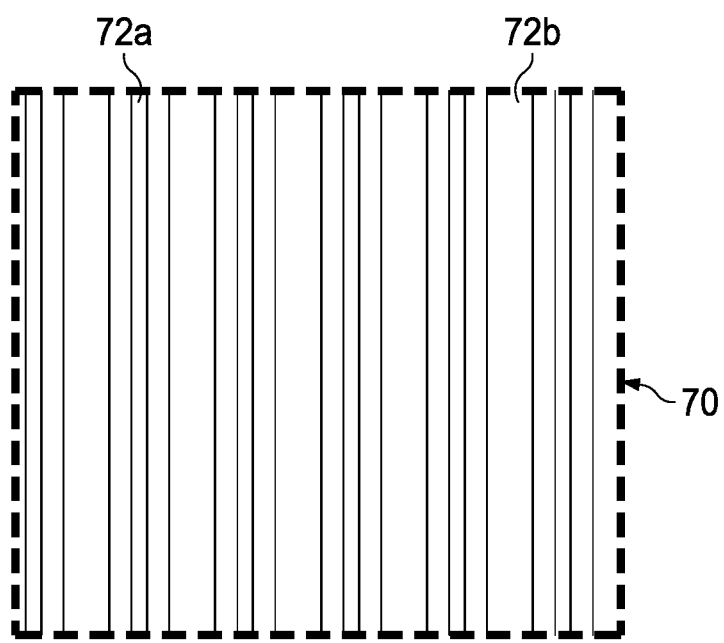
Figure 14:
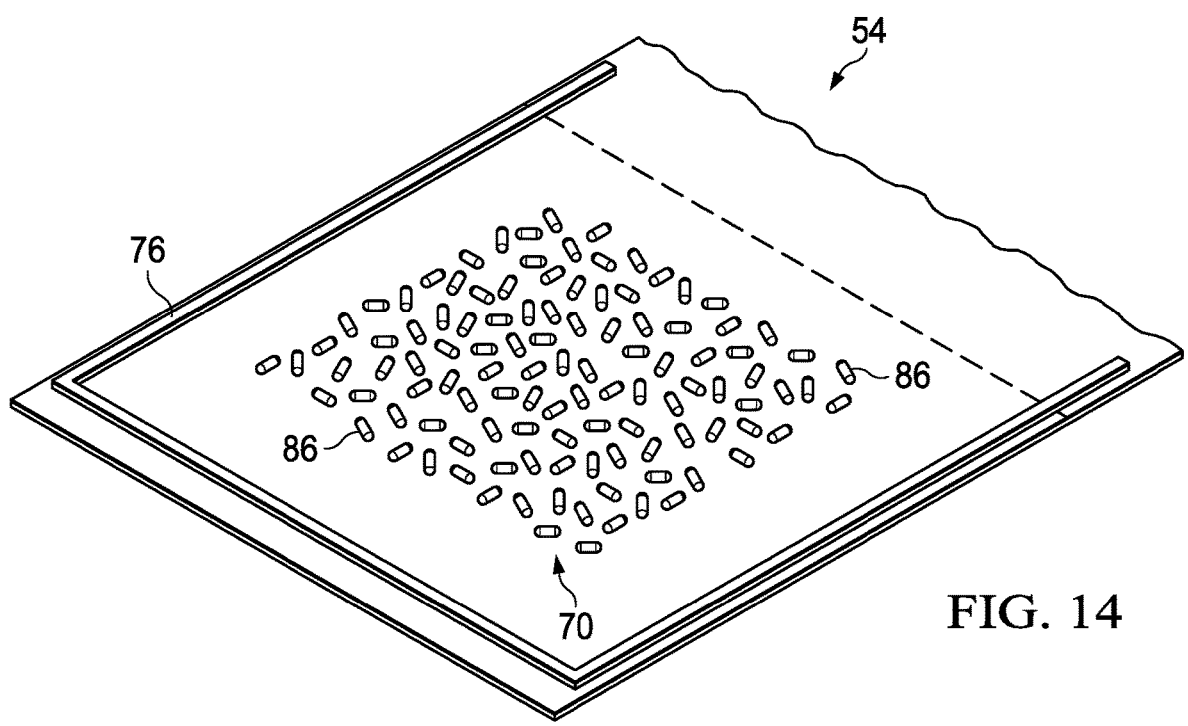
FIG. 14 is an illustration of a fragmentary, perspective view similar to FIG. 8 but showing use of pellets of a phase change material.

Referring to FIG. 13, in the example were solder rods 72 are used as the phase change material 70, solder rods 72a, 72b of differing diameters may be employed, arranged in separate groups (FIG. 13A) or in an alternating manner (FIG. 13B). Employing solder rods 72a having smaller diameters will allow the device 54 to flex and conform to curves and contours that may be present in the surface of a structure being repaired. Similarly, as shown in FIG. 14, the phase change material 70 may be in the form of pellets 86 held in place on the film sheet 68 by an adherent, such as a film adhesive (not shown). The pellets 86 are easily rearranged and displaced relative to each other, to allow the device 54 to conform to curves and contours in the surface of a structure.

Figure 15:
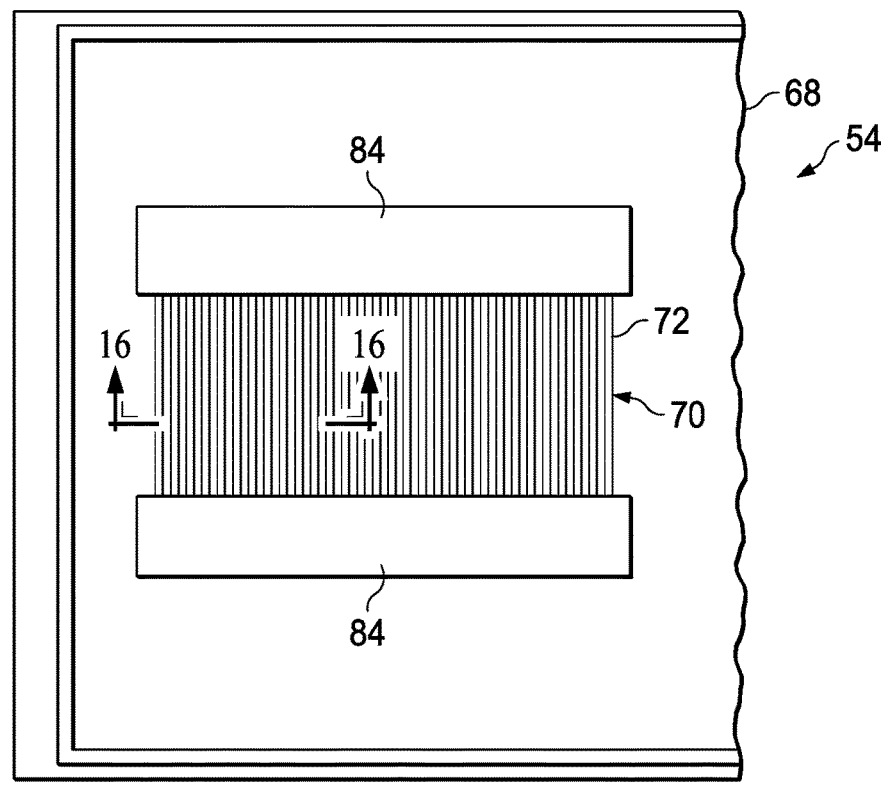
FIG. 15 is an illustration of a fragmentary, plan view of another embodiment of the thermal management device.

FIG. 15 illustrates an alternate technique for locating and holding the solder rods 72 on the film sheet 68. In this example, a pair of material strips 84 adhered to the film sheet 68 form pockets into which the opposite ends of the solder rods 72 may be inserted.

Figure 16:
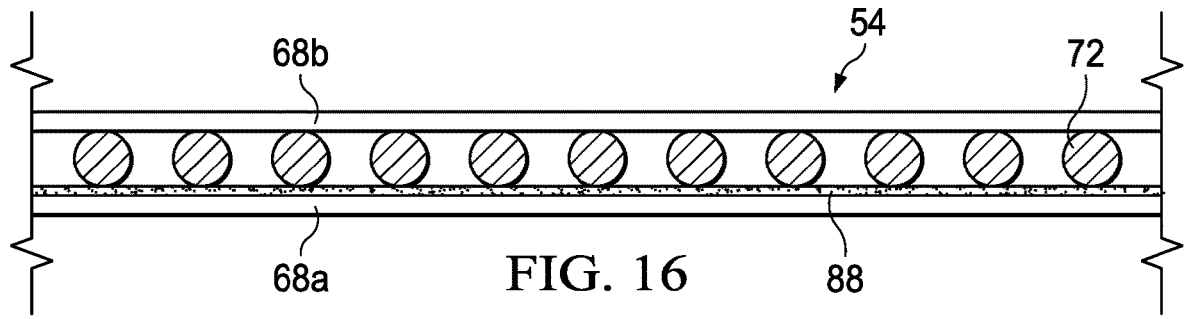
FIG. 16 is an illustration of a cross sectional view of an alternate example of the thermal management device.

FIG. 16 illustrates a further technique for locating and holding solder rods 72 on the film sheet 68. In this example, a paste or film adhesive 88 is used to adhere the solder rods 72 on one layer 68a of the film sheet 68.

Figure 17:
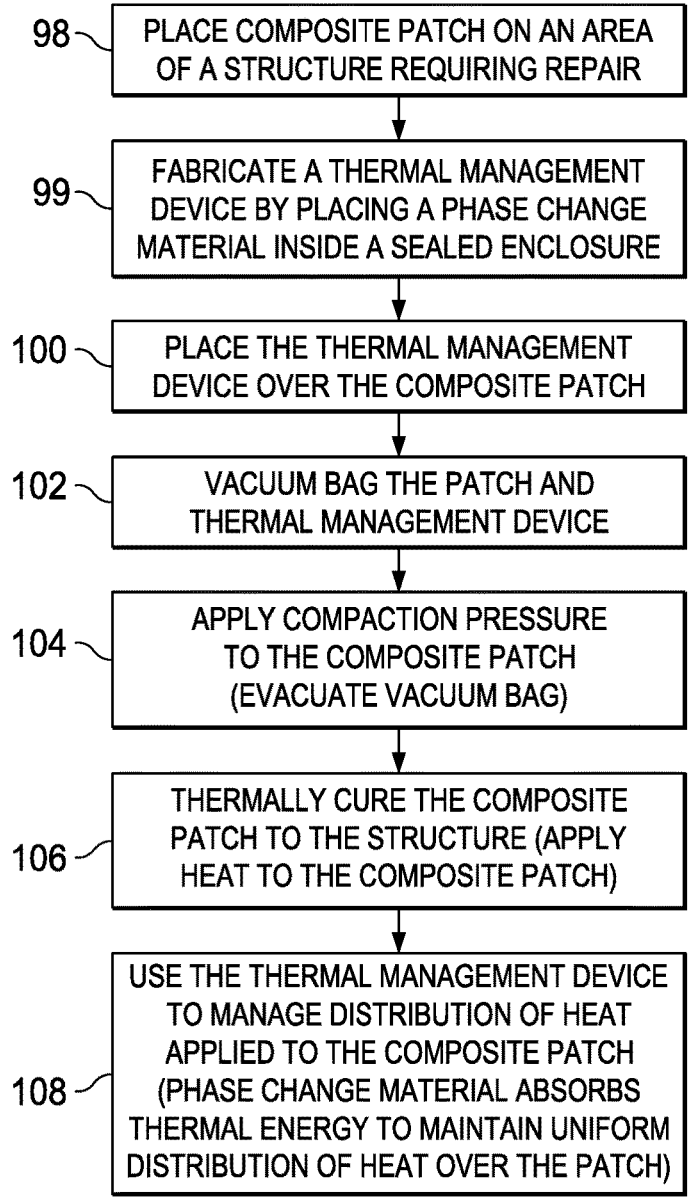
FIG. 17 is an illustration of a flow diagram of a method of repairing a structure using a composite repair patch.

Attention is now directed to FIG. 17 which broadly illustrates the overall steps of a method of repairing a structure using a thermally cured composite repair patch 42. As previously mentioned, the composite patch 42 may comprise a fiber reinforced composite laminate including either a thermoset and/or a thermoplastic resin. Beginning at 98, the composite patch 42 is placed on an area of the structure requiring repair. As previously mentioned, in some applications, a portion of the structure may be removed as by scarfing the surface of the structure to form a depression for receiving the patch 42, allowing a flush repair, while in other applications the repair patch 42 may be applied to the surface of the structure. A thermal management device 54 is fabricated at 99 by placing a phase change material inside a sealed enclosure 66, such as by placing solder rods 72 between two layers 68a, 68b of film 68 and sealing the layers 68a, 68b around the solder rods 72. At 100, the thermal management device 54 is placed over the composite patch 42 along with other components of a curing assembly 64 normally used in a vacuum bag processing such as a bleeder film 60 and a release film 56. The curing assembly 64, including the thermal management device 54, is vacuum bagged 102 by placing and sealing a vacuum bag 48 over the repair area 36.

At 104, compaction pressure is applied to the composite patch 42 by evacuating the vacuum bag 48. At 106 the composite patch 42 is thermally cured and bonded to the structure by applying heat 44 to the composite patch 42 using a heating blanket 52 or other commonly known techniques. At 108, the thermal management device 54 is used to manage the distribution of heat 44 applied to the composite patch 42 in order to avoid or reduce the severity of hot spots "H" that may occur in the repair patch 42. As previously mentioned, due to its simplicity and low cost, the device 54 is disposable, but may be reused, if desired.

Figure 18:
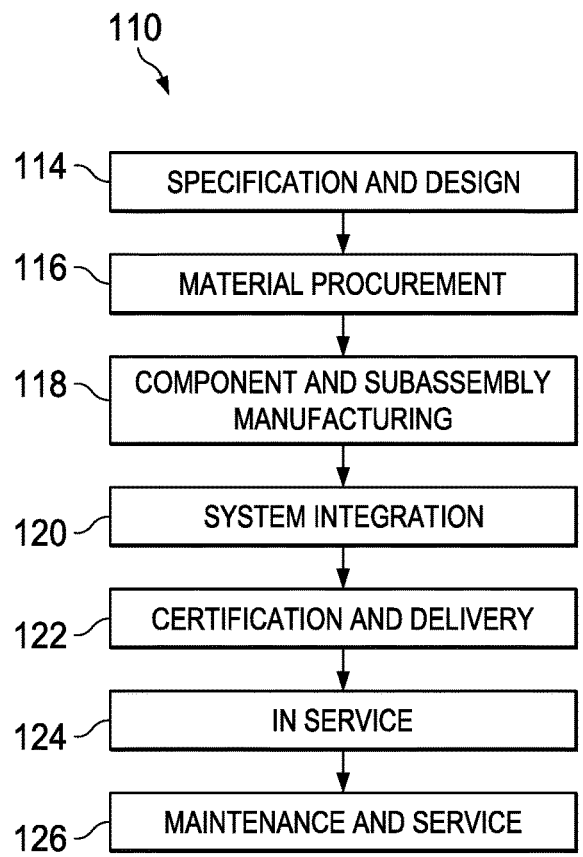
FIG. 18 is an illustration of a flow diagram of aircraft production and service methodology.
Figure 19:
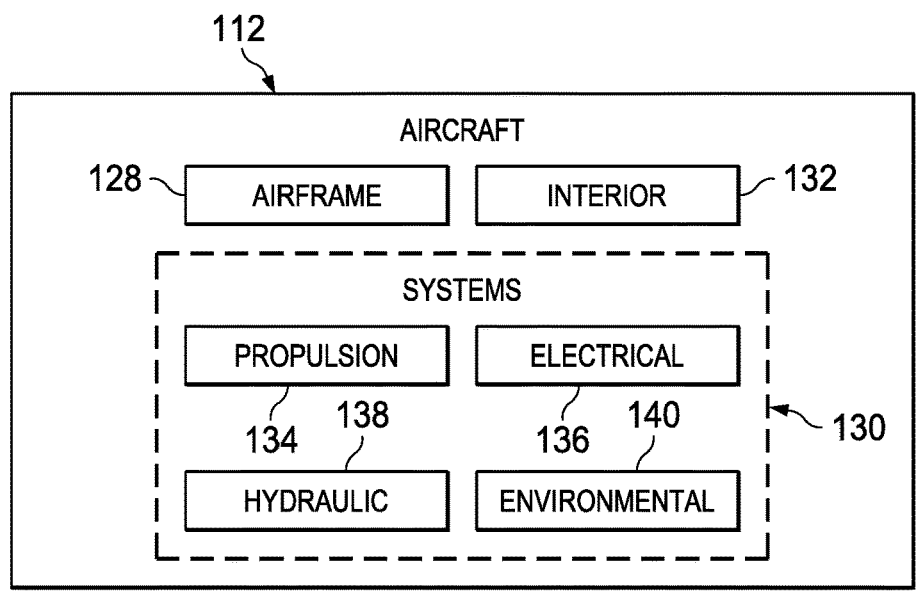
FIG. 19 is an illustration of a block diagram of an aircraft.

Embodiments of the disclosure may find use in a variety of potential applications, particularly in the transportation industry, including for example, aerospace, marine, automotive applications and other applications where global repair of a structure may be required. Thus, referring now to FIGS. 18 and 19, embodiments of the disclosure may be used in the context of an aircraft manufacturing and service method 110 as shown in FIG. 18 and an aircraft 112 as shown in FIG. 19. Aircraft applications of the disclosed embodiments may include, for example, without limitation, repair of various parts of the airframe 128 such as skins. During pre-production, exemplary method 110 may include specification and design 114 of the aircraft 112 and material procurement 116. During production, component and subassembly manufacturing 118 and system integration 120 of the aircraft 112 takes place. Thereafter, the aircraft 112 may go through certification and delivery 122 in order to be placed in service 124. While in service by a customer, the aircraft 104 is scheduled for routine maintenance and service 126, which may also include modification, reconfiguration, refurbishment, and so on.

Each of the processes of method 110 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 112 produced by exemplary method 110 may include an airframe 128 with a plurality of systems 130 and an interior 132. Examples of high-level systems 130 include one or more of a propulsion system 134, an electrical system 136, a hydraulic system 138 and an environmental system 140. Any number of other systems may be included. Although an aerospace example is shown, the principles of the disclosure may be applied to other industries, such as the marine and automotive industries.

Systems and methods embodied herein may be employed during any one or more of the stages of the production and service method 110. For example, components or subassemblies corresponding to production process 118 may be fabricated or manufactured in a manner similar to components or subassemblies produced while the aircraft 112 is in service. Also, one or more apparatus embodiments, method embodiments, or a combination thereof may be utilized during the production stages 118 and 120, for example, by substantially expediting assembly of or reducing the cost of an aircraft 112. Similarly, one or more of apparatus embodiments, method embodiments, or a combination thereof may be utilized while the aircraft 112 is in service, for example and without limitation, to maintenance and service 126.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A device configured to manage a thermal energy applied to a composite patch on a structure of a vehicle, such that the device comprises:
   a first layer of film and a second layer of film connected by an adhesive sealant that forms an enclosure between the first layer of film and the second layer of film;
   a plurality of rods retained side-by-side against the first layer of film such that the plurality of rods comprise a phase change material such that each rod in the plurality of rods comprises, respectively, a location selected relative to a component in the structure that sinks heat from the composite patch that comprises a cure temperature in a range of 150° C. and 200° C. or a consolidation temperature in a range of 345° C. to 400° C.

2. The device of claim 1, wherein the first and second layers of film comprise a sheet of film folded over onto itself.

3. The device of claim 1, wherein the adhesive sealant comprises a strip around at least three sides of the enclosure.

4. The device of claim 1, wherein the phase change material is attached to one of the first and second layers of film.

5. The device of claim 1, wherein each rod of the plurality of rods comprises a solder that comprises one of:
60% Sn and 40% Pb, and
63% Sn and 37% Pb.

6. The device of claim 1, wherein rods of different diameters are arranged in separate groups.

7. The device of claim 1, wherein rods of different diameters are arranged in an alternating manner.

8. A device configured to reduce hot spots in a composite patch placed on a structure of a vehicle and thermally cured in-situ, such that the device comprises:
a sheet of film folded over onto itself to form a first and a second overlapping layers of material;
a plurality of phase change material elements located between the first and second overlapping layers of material, each of the phase change material elements being formed of a phase change material configured to absorb thermal energy at the hot spots and maintain a substantially constant temperature, such that the phase change material elements comprise a plurality of rods arranged side-by-side on the first overlapping layer, such that each rod in the plurality of rods comprises, respectively:
a diameter that provides a flex to the device that conforms the device to a curve in the structure; and
a location selected relative to a component in the structure that sinks heat for the composite patch that comprises a cure temperature in the range of 150° C. and 200° C. or a consolidation temperature in the range of 345° C. to 400° C.; and
a seal between the first and second overlapping layers that encloses the phase change material elements.

9. The device of claim 8, wherein the phase change material elements have a melting point above a temperature at which the composite patch is thermally cured.

10. The device of claim 8, wherein the seal comprises a strip of adhesive sealant that extends at least partially around the phase change material elements.

11. The device of claim 8, wherein: the sheet of film includes a fold therein, and
the seal includes a strip of adhesive sealant extending from the fold around three sides of the first and second overlapping layers of material to enclose the phase change material elements.

12. The device of claim 8, wherein the sheet of film is a vacuum bag material.

13. The device of claim 8, further comprising:
adhesive tape; and
the phase change material elements attached to the first overlapping layer of material by the adhesive tape.

14. The device of claim 8, wherein the phase change material elements extend over only a portion of the first and second overlapping layers of material.

15. The device of claim 8, wherein the rods comprise solder rods.

16. A method of managing a thermal energy applied to a composite patch overlying a heat sink in a structure of a vehicle, the method comprising:
placing the composite patch comprising a cure temperature in the range of 150° C. and 200° C. or a consolidation temperature in the range of 345° C. to 400° C. on an area of the structure requiring repair comprising a component that sinks heat from the composite patch;
providing a thermal management device containing a phase change material forming a plurality of rods arranged side-by-side, on-a sheet of film such that each rod in the plurality of rods comprises, respectively:
a diameter providing a flex, in the sheet, conforming to a curve in the structure; and
a location selected relative to a component in the structure that sinks heat for the composite patch; and
folding the sheet of film over onto itself and sealing a first overlapping layer of the sheet to a second overlapping layer of the sheet and enclosing the phase change material therebetween with an adhesive seal extending along three edges of the sheet of film;
placing the thermal management device over the composite patch such that the phase change material overlies the component in the structure that sinks heat for the composite patch; and
thermally curing the composite patch, including applying heat to the composite patch.

17. The method of claim 16, wherein the plurality of rods comprising the phase change material are solder rods, and wherein the first and second overlapping layers of material are sealed together around the plurality of rods.

18. The method of claim 16, wherein providing the thermal management device includes:
the adhesive seal forming an enclosure;
placing the phase change material inside the enclosure.

19. The method of claim 18, wherein:
forming the enclosure includes folding the sheet of film onto itself to form first and second layers of film.

20. The method of claim 19, further comprising-adhering the phase change material to one of the first and second layers of film before the sheet of film is folded over onto itself.

* * * * *